Figure 3:
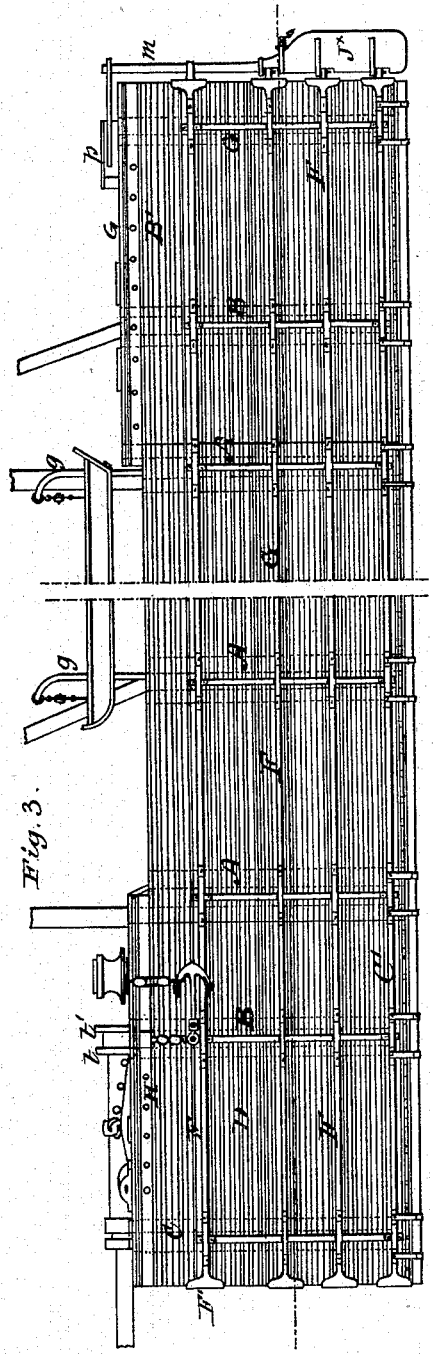

(No Model.) 6 Sheets—Sheet 1.
C. A. H. C. DE WINTER.
CONSTRUCTION OF SHIPS.
No. 249,442. Patented Nov. 8, 1881.
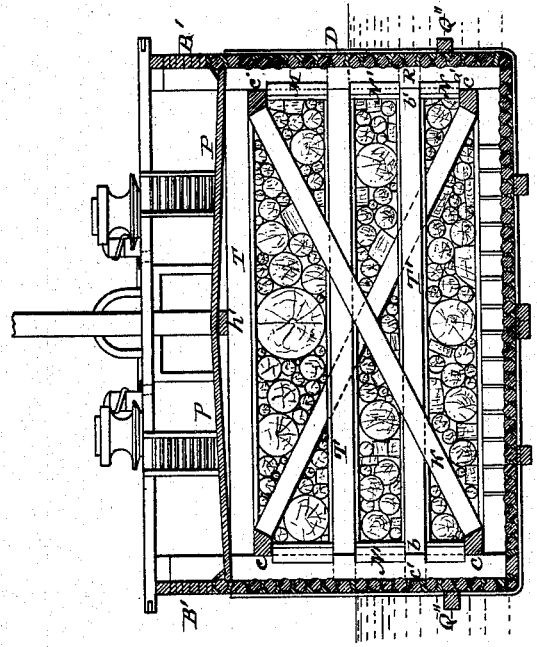
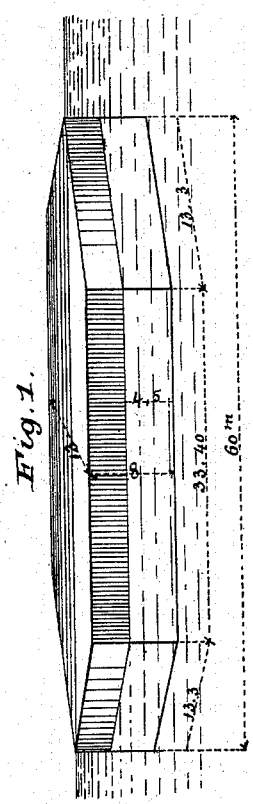
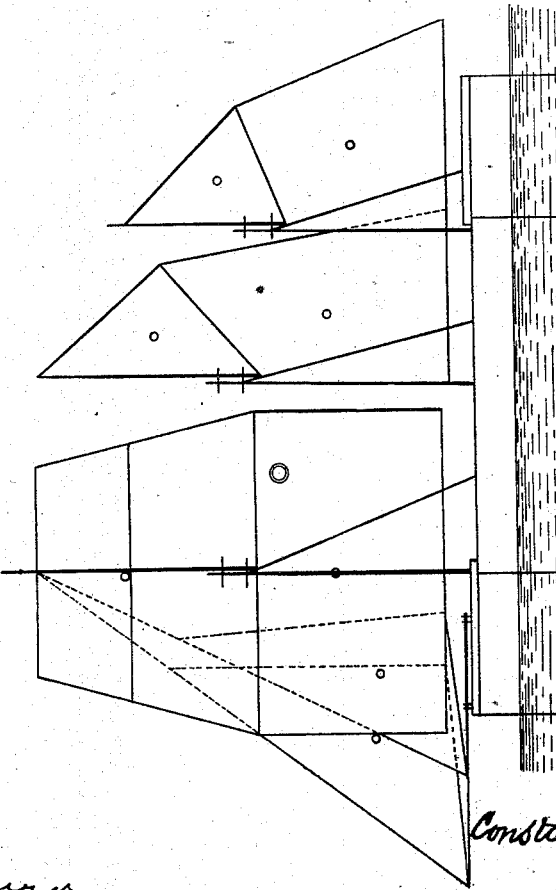
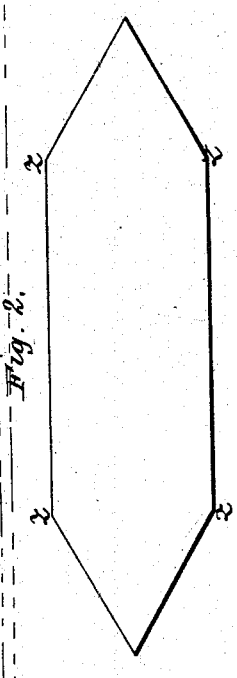
Witnesses:
E. E. Masson
Philip Mauro
Inventor:
Constantin A. H. C.
de Winter by
A. Pollok his attorney (No Model.) 6 Sheets—Sheet 2.

C. A. H. C. DE WINTER.
CONSTRUCTION OF SHIPS.

No. 249,442. Patented Nov. 8, 1881.

Witnesses
E. E. Masson
Philip Mauro

Inventor:
Constantin A. H. C. de Winter
by A. Pollok
his attorney (No Model.)  6 Sheets—Sheet 3.
C. A. H. C. DE WINTER.
CONSTRUCTION OF SHIPS.
No. 249,442.  Patented Nov. 8, 1881.
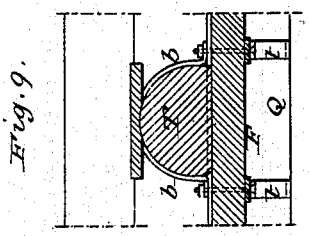
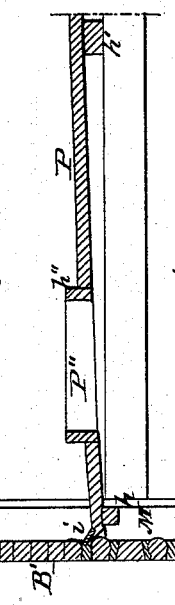
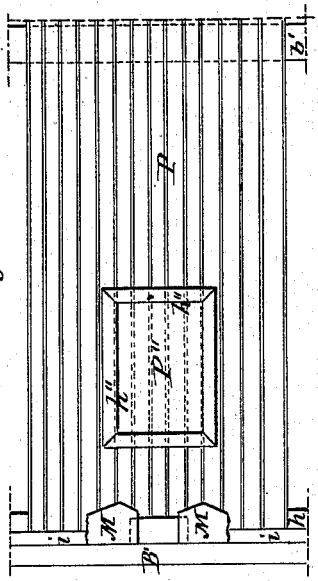
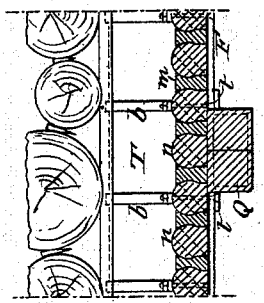
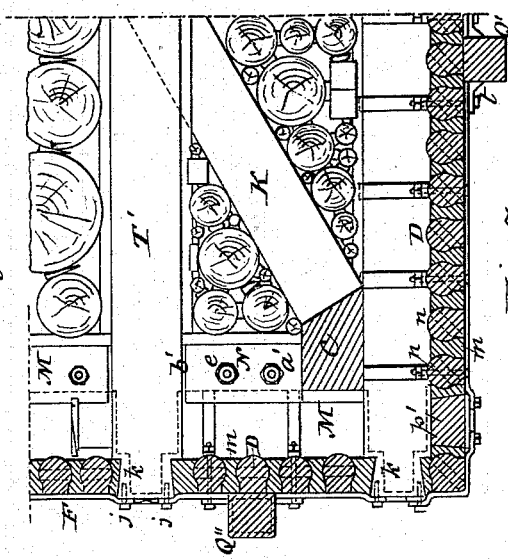
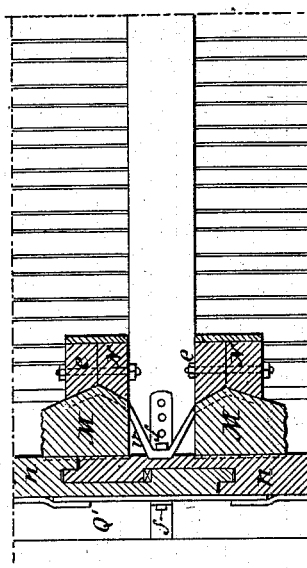
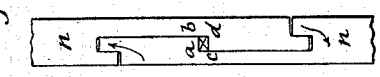
Witnesses:
E. E. Masson
Philip Mauro
Inventor
Constantin A. H. C. de Winter
by A. Pollok
his attorney

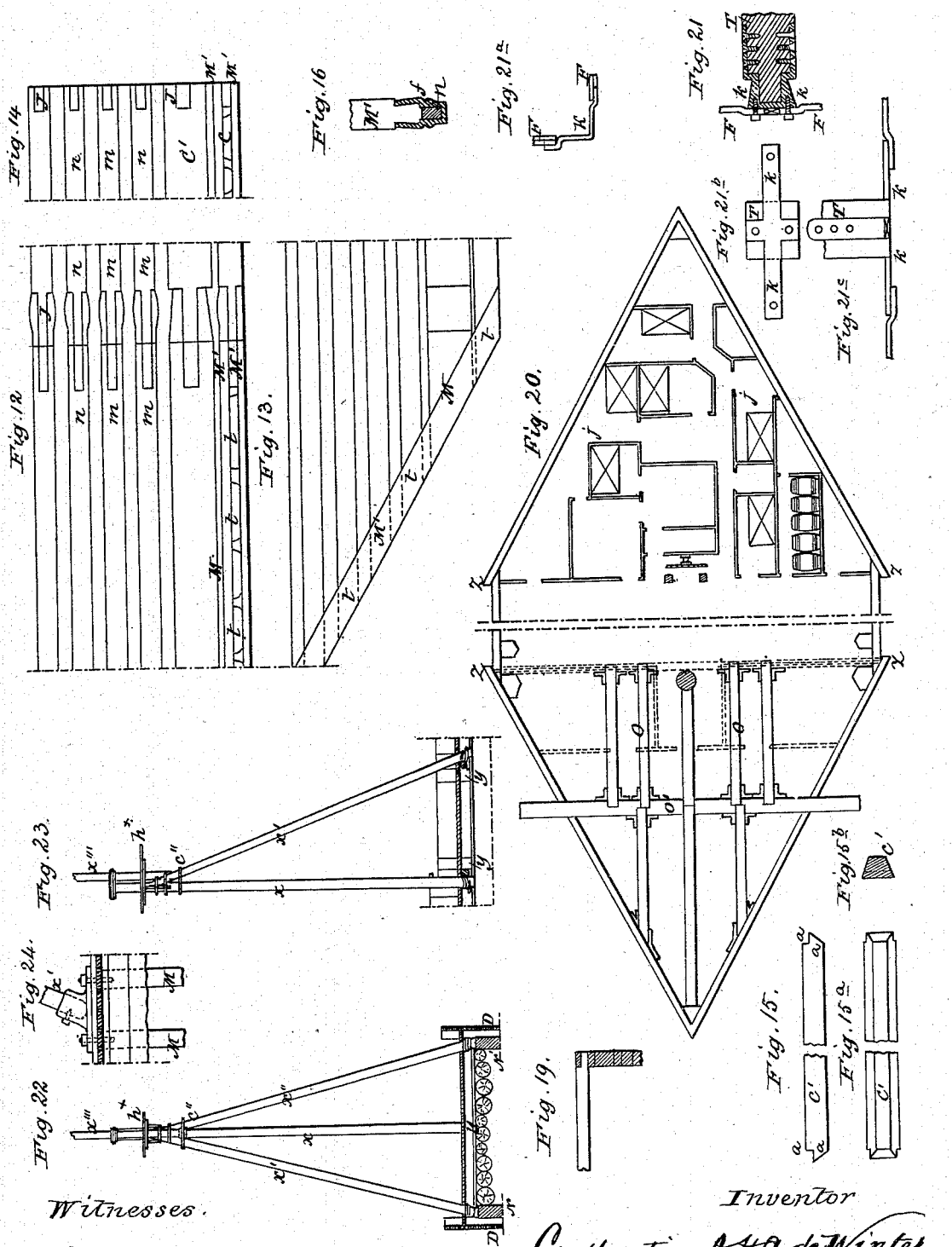

(No Model.) 6 Sheets—Sheet 5.
C. A. H. C. DE WINTER.
CONSTRUCTION OF SHIPS.
No. 249,442. Patented Nov. 8, 1881.
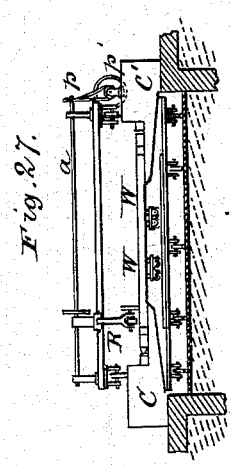
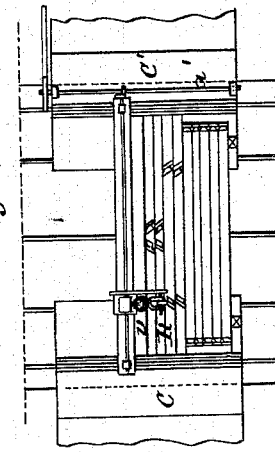
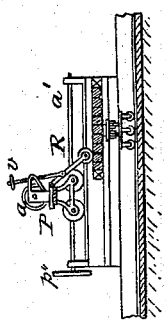
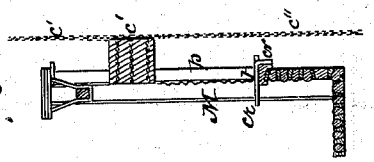
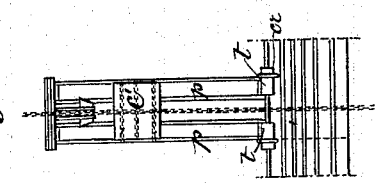
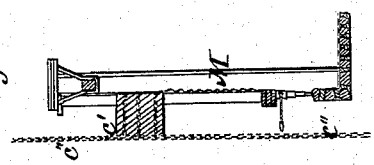
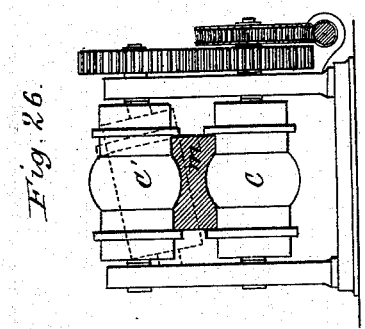
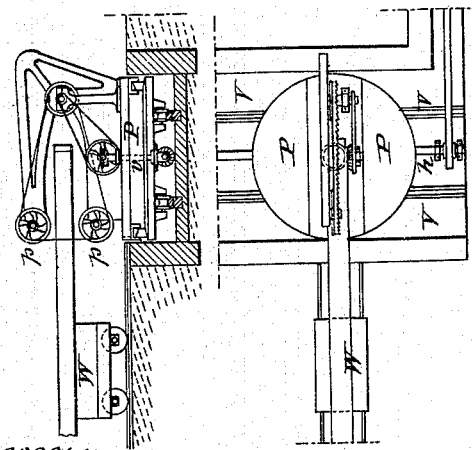
Witnesses:
E. E. Masson
Philipellam
Inventor:
Constantin A. H. C. de Winter
by A. Pollok
his attorney.

(No Model.) 6 Sheets—Sheet 6.
C. A. H. C. DE WINTER.
CONSTRUCTION OF SHIPS.
No. 249,442. Patented Nov. 8, 1881.
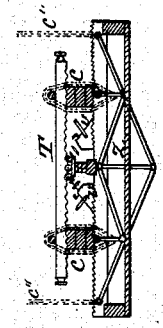
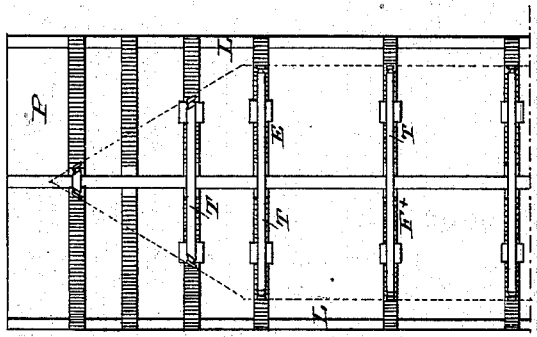
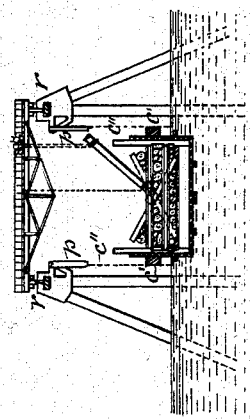
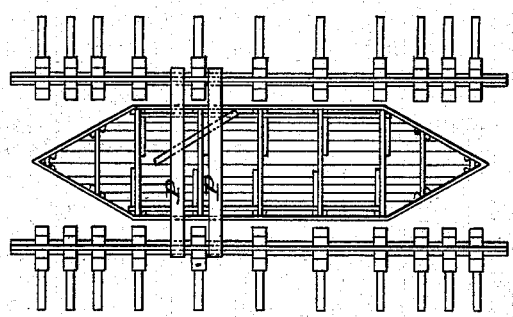
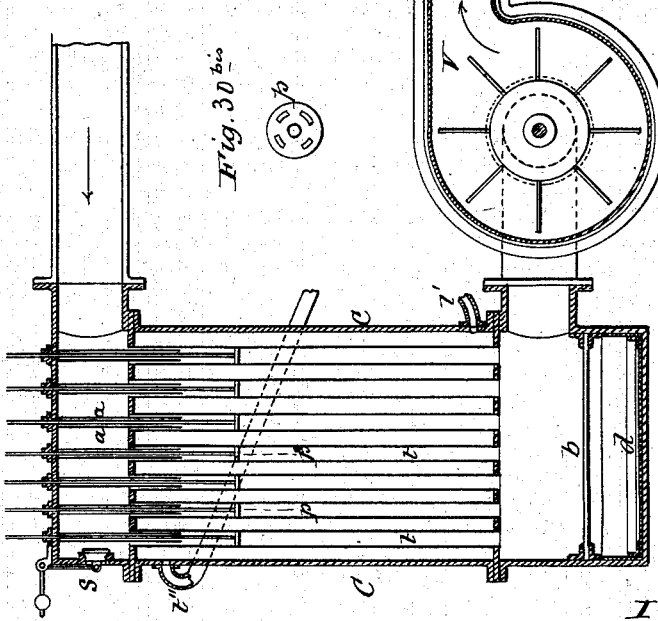
Witnesses:
E. E. Masson
Philip Mauro
Inventor
Constantin A. H. C. de Winter
by A. Pollok
his attorney

UNITED STATES PATENT OFFICE.

CONSTANTIN ADRIEN HERMAN CHRETIEN DE WINTER, OF MAUZÉ-ON-THE-MIGNON, FRANCE.

CONSTRUCTION OF SHIPS.

SPECIFICATION forming part of Letters Patent No. 249,442, dated November 8, 1881.

Application filed May 4, 1881. (No model.) Patented in France March 16, 1881.

*To all whom it may concern:*

Be it known that I, Baron CONSTANTIN ADRIEN HERMAN CHRETIEN DE WINTER, a citizen of the Republic of France, and residing in Mauzé-on-the-Mignon, France, have invented a System of Rapid Ship Construction, of which the following is a specification.

This invention relates to an improved system of shipbuilding, by means of which vessels employed for carrying cargoes of wood may be constructed with rapidity and economy.

In principle this system of construction is based upon the formation of a wall forming sides and rendered perfectly water-tight without the aid of calking. This wall, which is formed of hard wood and soft compressed wood interposed, is capable of being applied to structures of all descriptions where perfect impermeability is required, in damp and unwholesome situations, such as the dwelling-houses in certain colonies.

In addition to the production of this impermeable wall, my invention further relates to the rapid and economical construction of a ship or vessel by the employment of timber in a natural condition or roughly hewn or shaped, which vessel retains the usual conditions essential to navigation, and is, moreover, constructed entirely of timber, forming an article in commerce. For this purpose the number of joints is reduced as much as possible, and care is taken to cut only the bearing-surfaces of the timber and to avoid perforating or making deep cuts, except at the extremities, in order to preserve as great a length of timber as possible intact. All the timbers employed in the construction proper are straight, in order to simplify the operation of shaping the same as much as possible. The timber, which it is desired to transport without being cut transversely—that is to say, in its full length—is arranged in the interior, and is rigidly tied or connected to the sides or walls of the vessel in such a manner that the latter, with its cargo, forms a solid block of absolute rigidity. This method of stowing is hereinafter described. In order to render the construction simple, rapid, and economical, spiking or tree-nailing is nearly dispensed with, being employed at the extremities only, and the pieces being gaged or cut to a certain pattern, the work of fitting and adjusting is avoided, and the operation of constructing or taking to pieces a vessel is reduced to simply putting the parts together or taking them apart, and is rendered capable of being performed with the utmost celerity. The hull is consolidated by being bound together by iron bands bolted to one another and to the sides of the vessel, which they surround in vertical and horizontal directions. The masts employed are constructed on the tripod or three-leg system, in order to avoid the necessity of causing the foot or heel of the mast to descend to the bottom of the vessel, and the masts are formed of timber in a natural state, so that the latter is in no way deteriorated by being thus employed.

From the foregoing statement it is evident that the vessel is composed of two distinct descriptions of materials, namely: first, the vendable timber forming the hull, the masts, and the cargo; and, secondly, the outfit of the vessel, comprising the sails, the rigging, and tackle, the accommodation for the crew, chains, anchors, and other appliances for working the vessels. The said outfit, which represents the dead-weight of the ship, constitutes the permanent material, which, after the vessel has arrived at the port of destination and been taken to pieces, is immediately placed on board a special steamer and carried back to the place of production, where it is employed again on other vessels of the same construction. According to calculation the dead-weight in the present instance, the weight of the outfit being two hundred and thirty-four and the displacement of the vessel three thousand two hundred and thirty-four tons, is only about seven per cent. of the total weight, in lieu of being from fifty to sixty per cent. as in ordinary ships.

The method of constructing or building the vessel is one of the peculiar features of the system. According to this method of construction the first operation consists in forming, in the manner hereinafter described, a species of light basin composed of the bottom and a small portion of the sides of the vessel. This basin, made on the dry land, is subsequently launched and loaded with the cargo. The size of this basin, which corresponds to the dimensions of the first compartment of the vessel, is determined by this condition—namely, it should be capable of being filled with timber, as well as the second compartment of the vessel, without causing the total weight thus obtained to exceed its displacement. These dimensions are made as small as possible in order to reduce to a minimum the number of patterns of pieces employed in the construction of the apparatus employed in building the ship. After this the building is proceeded with in inverse order, the cargo being first arranged between the uprights, which form the ribs, and subsequently covered with the case or envelope. The containing portion is consequently in a state of tension upon the contained part, whereby the absolute rigidity of the structure is insured.

Vessels constructed on this system are peculiarly adapted for the transport of cargoes of timber under most advantageous conditions; but they may also, by undergoing some slight internal modifications, be employed for the transport of fragile goods, and I desire to claim this application.

In order that the system of rapidly constructing vessels may be more fully understood, together with the details of the construction, the tools necessary for shaping the wood employed in the construction, the apparatus used in building the ship, &c., I will now proceed more particularly to describe the same with reference to the sheets of drawings hereunto annexed.

With a view to rendering this description as intelligible as possible I have divided it into four distinct heads or chapters, videlicet: first, the general construction of the ship, represented in Figures 1 to 5; second, the details of the construction, represented in Figs. 6 to 24; third, machine-tools for shaping the wood, illustrated in Figs. 25 to 30; fourth, apparatus employed in building up the vessel, shown in Figs. 31 to 37.

The vessel is of rectilinear and geometrical form, and is represented in perspective in Fig. 1, which also indicates its principal measurements. All the conditions essential to efficiency have been duly worked out. Stability, dead-weight, rigging, rudder, &c., have all been calculated with special care, and these various calculations, performed with practical data, enable me to insure the seaworthiness of the ship. I have even, for the first trials to be made of this system, sacrificed speed to safety.

With regard to the rig represented in Fig. 2, I have adopted the three-mast or schooner system, in order to reduce the number of hands required as much as possible.

Figure 4:
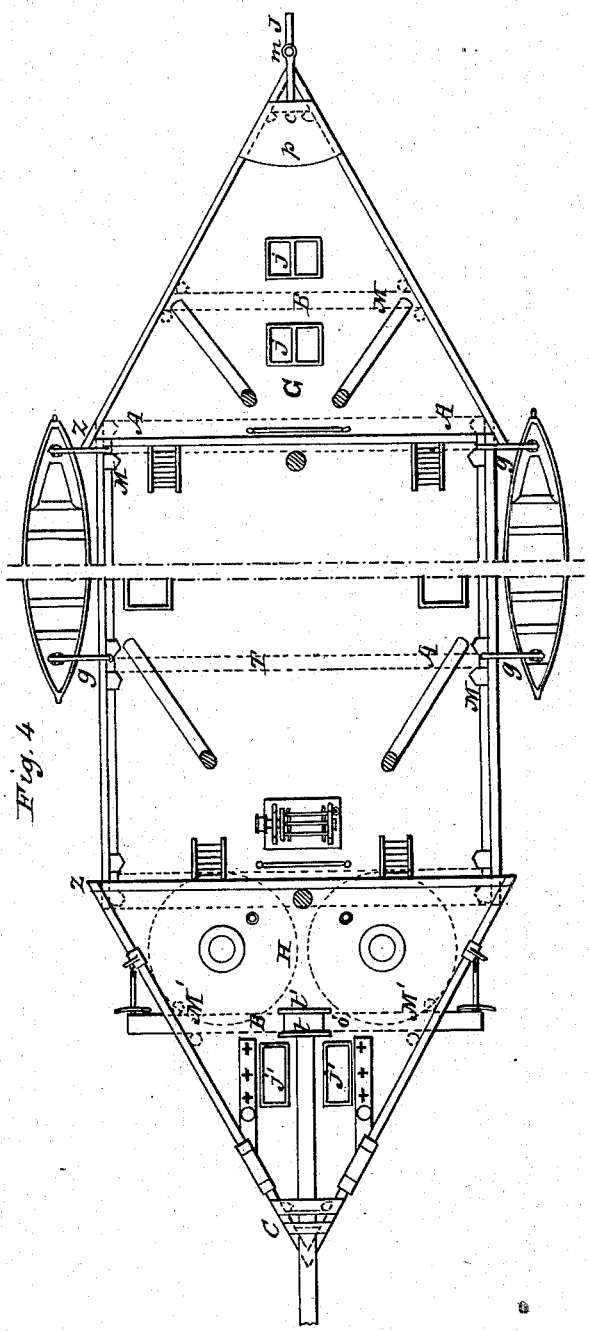

On carefully examining Figs. 3, 4, and 5, which represent the ship drawn to a scale in elevation, plan, and transverse section, it will be observed that the hull is formed of a certain number of frames, A B C, each of which is composed of cross-beams T and uprights M. The space between these frames is maintained by the sides D and wedge-pieces C', to which the connecting hoops or bands F are attached. The after part of the deck P is surmounted by a poop, G, the deck of which is supported by a prolongation of the bulwarks or netting B'. The forecastle H is constructed in a similar manner. The chock M of the rudder $J^\times$ rises above the poop, and the tiller passes under a small deck, $p$, where there are chains, which are connected to a steering-wheel situated in the usual position underneath the poop. This ship is provided with the tackle and all appliances required for its navigation, davits for the boats, ventilating-hatchways, bits, capstans, cat-heads, anchors, &c., all of which are shown in the general plan.

Having thus concisely described the general construction, I will now take each part separately, in order to show clearly the manner in which I obtain simplicity of construction combined with rapidity in the building.

*Keels and keelsons, Figs. 6, 7, 8, and 9.*—The keel Q, Figs. 8 and 9, is formed by two rows of beams laid side by side. The keelsons Q' $Q^2$, Figs. 6 and 7, are each made of a single row of beams. The latter are four in number, and their object is to moderate the rolling, two being arranged under the bottom of the vessel and two at the sides. (See Fig. 5, Sheet 1.) The two latter do not extend beyond the central portion of the vessel. These parts are formed of timbers joined together end to end by plain scarf-joints and secured by wood-screws. They are connected to the ship by straps $e$, bolted through the bottom to bands $b$, surrounding the lower transverse timbers, T, which bear against the uprights M. The same bolts also pass through the consolidating-bands F, let into suitable recesses in the keels and keelsons, in order to prevent longitudinal displacement. The external timbers or walls forming the bottom and sides, Figs. 6, 7, 8, and 9, are all formed of squared balks $n$, of a certain form, and are slightly let into corresponding recesses formed in the horizontal cross-beams T and uprights M, in order to oppose, during the process of construction, a powerful resistance to a too rapid expansion of the filling-pieces, and also to enable the timbers to be placed in the exact position which they are required to occupy without necessitating special adjustment. The external timbers or walls of the bottom and sides are divided transversely into several pieces, connected together by the joint shown in Fig. 7. In order to facilitate the operation of building the ship the joints of the external timbers of the bottom are made in a plane inclined at an angle of forty-five degrees, as shown in Figs. 10 and $10^{bis}$. The joints in the side timbers are made in a vertical plane. (See Fig. 11 and the dotted lines in Fig. 6.) The joints forming weak points are placed opposite the transverse timbers and uprights, and secured directly to the latter by wooden pins, being also arranged in such a manner as to break joint precisely in the same manner as ordinary brick-work.

*Filling-pieces of the bottom and sides.*—These consist of pieces $m$ of soft wood, compressed, as hereinafter described, and interposed between each external timber, Figs. 6, 7, 8, and 9. These pieces are not only compressed, but all moisture is also extracted from them on a special drying apparatus. It will be readily understood that as soon as they are immersed in water these filling-pieces tend to revert to their original form and press the walls or timbers tightly together, and constitute, by their intimate contact with the latter, a wall, without calking, perfectly water tight, and firmly connected, as hereinbefore described, to the cross-beams in the case of the bottom and to the uprights in the case of the sides. The external timbers and filling-pieces of the bottom are united at the extremities of the latter by tenons $t$, fitting between two timbers, M′, to which they are secured by pins. (Figs. 12, 13, and 14 clearly show this description of connection.) The walls or external timbers and filling-pieces of the sides, at the part where the side of the ship changes its direction, are connected by a fork-joint, J, having a wooden pin passed through it, whereby the operations of putting together and especially taking apart are greatly facilitated. At the angles Z of the ship leakage is prevented by a slight calking at the intersection of the wales.

*Longitudinal wedges.*—These wedges C′ consist of pieces of hard wood, (shown separately in Figs. 15 and 15$^{bis}$,) and form a filling between the feet of the uprights M and the ends of the transverse beams T and T′, being shaped of corresponding outline and connected to these beams by joggles $a\,a$. These wedges are shown in position in Figs. 3, 5, 12, 13, and 14. In the three last figures it will be observed that they are connected in the same manner as the external timbers by timbers M′ and fork-joints J. The uprights M M′ are formed by two straight posts, grooved and fished or coupled together. The feet of the upright M′, near the extremities of the vessel, are connected by iron bands to the external timbers of the bottom, Fig. 16, being suitably recessed for the reception of an iron band, $f$. The feet of the uprights M at the center of the vessel are of similar form to the ends of the cross-beams, in order to connect them to the longitudinal wedges C′. Between the posts of the uprights there is arranged a timber, $p'$, which I term a "supporting-block," being simply a wedge of reduced length, supporting the horizontal cross-beam T, Fig. 6.

*Upper horizontal transverse beams.*—These transverse beams or timbers T′ are arranged above one another in any suitable number, being in all respects similar to the beams T, hereinbefore described, and rest upon supports placed between the posts of the uprights in the same way as the block $p'$ of the lower transverse beams, T, so as to divide the vessel into a corresponding number of compartments.

*Diagonal timbers, Figs. 5 and 6.*—In the case of ships of ordinary construction distortion is prevented by curved timbers; but I prefer to employ in place of these curves diagonals K, which consist of large beams arranged in the form of a St. Andrew's cross, and rendering any transverse distortion impossible. The extremities of the diagonals are wedged up, so as to be well tightened up on the longitudinal timbers C and C′, which extend throughout the whole of the central part of the vessel.

*Large lateral wedges.*—By means of wedges N N powerful pressure is exerted on all the external timbers of the sides, and the wood or timber within the vessel is at the same time firmly secured in position. These wedges bear on one side against the uprights M and on the other side against a strip of soft compressed wood placed between the wedges and the cargo. The said wedges are made in two parts, connected by bolts $e$, in order to facilitate taking apart. In putting in the wedges N N it is necessary to avoid disturbing the parallelism of the uprights, which would have the highly undesirable effect of producing lateral pressure, and, consequently, endangering the tightness of the bottom. The required result is obtained by causing the uprights to incline slightly inward in the first place, so that the dovetail at the extremity of the transverse beams projects slightly on the exterior. It will be readily understood that when the wedges N N are driven in a vertical direction the uprights are pushed outward into a vertical position, and the requisite tension is finally imparted to the external timbers of the side. The pressure will be nothing at $a'$ and considerable at $b'$, Figs. 6 and 7. This only applies to the lower wedges, N N, as the wedges N′ N′ may be tightened up in any desired manner, their sole object being to secure the cargo. These wedges, moreover, are placed in position after the iron bands have been put on.

*Deck-planks, hatches, bulwarks, or netting, Figs. 17 and 18.*—The deck P is formed by planks of hard wood, trenailed to beams $h$, extended from one upright to another at the side of the vessel and to beams or strakes $h'$, at the center of the vessel, which cause the planks to assume the curvature requisite to enable water to run off readily. This water is collected in a scupper, $i$, formed by an inclined plank fitted into recesses in the side and in the deck, the joints being calked. Strips of soft, dry, and compressed wood are inserted between the planks, and serve to render the deck perfectly water-tight by being caused to swell under the action of the water employed to wash the decks. Hatchways P″ are formed in the deck, to provide means of access to the interior of the ship. The combings $h''$ of these hatchways are simply trenailed to the ends and sides of the deck planks. The nettings or bulwarks B′ are constructed of squared timbers, forming a continuation of the sides, and terminating at the upper edge in a timber of smaller dimensions. All these timbers are of hard wood and connected together by trenails.

*Poop and forecastle, Figs. 19 and 20.*—The poop is formed by an extension of the sides D, carried above the bulwarks or netting, so as to obtain the required height between decks. Above the rail of the gunwale I add a strake of planks pinned to the heads of the uprights. The deck of the poop G is constructed of planks similar to the planks of the main deck, but which are caused to engage between two timbers by means of a tenon entering the lower half of the strake of planks, being supported in the middle by suitable timbers, Fig. 19. The accommodation for the ship's officers is arranged in the space under the poop, which is lighted and ventilated by hatchways $j\ j$. The arrangement is shown on the right of Fig. 20. The forecastle is constructed in a similar manner to the poop, but possesses greater strength, being consolidated by longitudinal timbers O and transverse beams O', supporting the bits and capstans, as shown in Figs. 4 and 20. This wood-work constitutes a frame covered with planks similar to those of the deck. This flooring affords shelter for the crew, being ventilated and lighted through hatchways and portholes formed in the sides. This arrangement is shown in dotted lines on the left of Fig. 20. The boats are suspended from davits $g\ g$, Figs. 3 and 4.

*Iron-work for consolidating the structure.*—Iron-work is employed in order to consolidate and bind together, as hereinbefore described, all the pieces of timber employed in this system of construction. By prolonging the iron bands in horizontal and vertical directions, and connecting them to one another and to the ends of the horizontal transverse beams, a double belt or hoop is formed round the vessel. The horizontal bands F terminate in wide iron plates F', embracing the stem and stern of the ship, Fig. 3. The plates of the stern carry the hooks for the rudder $J^x$, and those at the stem the bob-stays of the bowsprit. The vertical bands are secured by screws $s$, which pass through the external timbers of the sides. These bolts $s$ bear against lugs $v$ on an iron plate, which embraces the two posts of the uprights and binds them firmly together, Fig. 7. The horizontal bands are carried alongside of the longitudinal wedges, to which they are attached by wood-screws. The extremities of these bands are bolted to iron cross-pieces $k$, attached to the ends of the transverse beams, the said cross-pieces being provided for this purpose with iron straps, Figs. 6, 7, and 21, embracing the dovetail tenon on the beam, while the four arms of the cross-piece lie against the exterior of the vessel and are bolted to the horizontal and vertical consolidating-bands. The sides are connected to the bottom by means of angle-irons $k'$, as shown in Figs. $21^{bis}$ and 26.

*Masts, Figs. 22, 23, and 24.*—The masts are arranged on the tripod system, as hereinbefore observed. The three legs $x\ x'\ x^2$ are tied to the transverse timbers $y$ and rest upon the trees stowed in the interior and upon the large vertical wedges. The requisite inclination is imparted to the mast by wedging up the legs. The mast proper, $x$, is connected to the legs $x'\ x^2$ by means of a notch and three iron hoops tightened by screws. I arrange the top-mast $x$ in a fid, $c^2$, aft, in order to throw the weight upon the two legs $x'$ and $x^2$, thereby enabling cheeks to be dispensed with and the top $h^x$ to be reduced to a simple light platform supported by T-irons on the two first hoops. The two legs $x'\ x^2$ of the mizzen-mast bear flat and directly over the upright, to which they are connected by a cast-iron shoe, pinned to the leg and to the uprights, Fig. 24. The bowsprit, Figs. 3 and 4, is maintained by two iron collars, C C', and secured forward by collars bolted to the ends of the uprights at the extremity of the vessel.

*Machine-tools employed in shaping the timber employed in the construction—Band-saw, Fig. 25.*—The joints of the external timbers of the sides and bottom require to be made in a very expeditious manner. This is accomplished by cutting them out in the requisite form by the aid of a band-saw. The type of saw employed is one that is capable of moving in all directions. For this purpose I mount the saw upon a rotating plate, P, capable of traveling upon a railway, $v$, arranged at right angles to the direction of motion of the piece of timber under operation. The latter is carried upon a truck, W, and partakes of a longitudinal motion backward and forward in the direction of its axis only. The work to be performed consists simply in making two straight cuts, $a\ b\ c\ d$, Fig. 11. The others may be curved (see same figure) perfectly, capable of being produced by the band-saw. Motion is imparted to this saw by a vertical shaft, $v$, passing through the axis of the rotating plate and receiving its motion by the intervention of bevel-wheels from another horizontal shaft, $h$, carrying the driving-pulley, and provided throughout its entire length with a groove or keyway, along which a key or projection on the corresponding bevel-wheel is capable of sliding. The motion imparted to the saw is thus rendered independent of the position which it occupies upon the railway $v$. The rotating plate P, as well as the trucks W, which carry the timber, are operated by hand by means of endless screws and gearing. (Not shown in the drawings.) It is evident that the pulley $p$ may be raised and the pulley $p'$ lowered to the extent of one spoke or radius in order to facilitate cutting the heads of the transverse beams and the feet of the uprights.

*Rollers for compressing the filling-pieces, Fig. 26.*—The rolling apparatus shown in this figure serves for compressing the soft wood dried, as hereinafter described, and to form therein the depressions for the reception of corresponding projections on the external timbers of the sides and bottom. The apparatus consists of two cylinders, C and C′, suitably adapted to impart the required form to the filling-pieces, and actuated as shown in the drawings. The cylinder C′ may be replaced by another cylinder having straight sides, arranged in the position shown by dotted lines, for the purpose of rolling the filling-pieces, which are to be placed next to the longitudinal wedges.

*Plane with traveling support, Figs. 27, 28, and 29.*—In setting up the transverse timbers and uprights it is of importance that all the grooves formed in these pieces should be exactly in a straight line. This is readily obtained by placing all these pieces side by side between two very large frames, C C′, of wood-work. Before fixing them in this position they are slightly raised and allowed to rest upon the trucks W, upon which they were conveyed. They are afterward lowered by means of hydraulic jacks, the blocks placed between them and the trucks having been previously taken out and packed upon the frames C C′, and wedged up. When these timbers are thus put together and secured the axis of the grooves are marked out with a line, and the work may then be proceeded with. The plane R, which cuts the grooves, is carried by a traveling support, P, moving upon rails by the aid of screws and gearing. Motion is imparted to the plane R by a shaft, $a$, parallel to the support P and driven by a pulley, $p$, carrying a belt which passes round another pulley, $p'$, mounted upon a second shaft, $a'$, arranged at right angles to the first. The latter carries at one extremity a driving-pulley, $p^2$. The shaft $a$ carries a pulley following the movements of the cutter, which is moved about by hand, and serving to impart motion to the tool-holder, the height of the latter being readily adjusted by means of a screw worked by a hand-wheel, $v$. The frame of the tool-holder oscillates upon a point, $x$, carried by the traveling support, which runs on wheels. Underneath the frames C C′ a very large truck or carriage, T, is shown, which I term a grid, and upon which the transverse timbers and uprights are carried.

*Drying stove or chamber, Fig. 30.*—It is found by experience that soft wood in general—that is to say, wood free from incrusting matter or resin—dried at the temperature of the atmosphere, then rolled and afterward immersed in cold water, resumes its original dimensions in a very short space of time. This is not the case, however, when the drying is effected at a very elevated temperature. Acting upon this data I prepare the filling-pieces with green wood capable of swelling by reabsorbing moisture, and dry it under conditions imitating drying in the open air as nearly as possible. With this object the green wood, after being reduced to the dimensions of the filling-pieces, is introduced into a drying-chamber hermetically closed. The air contained in this chamber is previously expelled by admitting steam, which, as it merely passes through, does not contribute to raise the temperature of the wood. After a few moments, the inlet and outlet for steam being closed, the valve of a condenser is opened, whereupon the whole of the steam is condensed and a certain amount of vacuum is obtained in the chamber, which is highly favorable to the extraction of the air and sap contained in the pores of the wood. A certain quantity of air is then admitted to the drying-chamber, the said air having been previously dried and cooled by passing through the condenser, the sides of which are maintained at 10°, then again heated to 30°—for example, in a heat-regenerator. It is known that at a temperature of 30° a cubic meter of air absorbs, in order to attain saturation, a quantity of aqueous vapor equal to about thirty grams. At a temperature of 10° it only absorbs about two grams in order to arrive at the same condition. Hence it may be concluded that each cubic meter of air leaving the drying-chamber at 30° loses, in passing through the condenser at 10°, a quantity of aqueous vapor equal to twenty-eight grams. It is thus easy, the dimensions of the chamber being known, the said dimensions varying according to the quantity of wood to be dried, to calculate the number of times that the air will require to pass from the drying-chamber to the condenser, and vice versa, in order to obtain the complete desiccation of soft wood. The drying-chamber in itself presents no remarkable features. The arrangement which I prefer to adopt for the condenser is next hereinafter described. In a cylindrical or rectangular chamber, C, there is arranged a series of parallel tubes, $t$, surrounded by the cooling-liquid, which circulates continually between a refrigerating-machine of any suitable construction—such as Pictet's system, for example—and the condenser passing through inlet and outlet pipes $t'$ and $t^2$. The air from the drying-chamber passes inside the tubes, depositing its moisture along the sides of the tubes in the form of a layer of ice, and leaves the condenser, being exhausted by a fan, which delivers it in a dry condition into the drying-chamber, and so on in succession. The ice is continually being detached by pistons $p$, partaking of a reciprocating motion. This ice falls into a drawer, $d$, whence it is removed by hand, care being taken to previously close a door, $b$, which shuts off the communication with the exterior. The pistons $p$ are formed by disks perforated with holes, Fig. 30$^{bis}$, in which rods $a$ are caused to engage during the ascent of the pistons, for the purpose of detaching and knocking off the ice, which might otherwise adhere to the said pistons and prevent them from operating. The condenser is completed by an air-inlet valve S.

*Apparatus for putting the ship together—Preliminary operations.*—The putting together or operation of building up the ship is performed between two jetties thrown out from a wharf constructed upon piles, Figs. 36 and 37. Traveling carriers or cranes P, provided with differential windlasses, run upon an overhead railway supported by the two jetties and serve to transport the timbers employed both for constructing the ship and forming the cargo. Half-way up the jetties there is provided a flooring or scaffold, forming a gangway, and serving to carry the workmen and tools during the construction. The piles of the wharf are strengthened laterally in the usual manner and covered with iron-work, which embraces both the longitudinal timbers and the rails $r$, supporting hydraulic pistons $p$, working as hereinafter described. The traveling carriers are worked or controlled by hand by means of tackle connected with steam-winches. The wharf supports, by means of chains $C^2$, connected to the hydraulic pistons $p$, a platform composed of trusses $F^x$ and longitudinal beams L, cut level with the trusses. (See Figs. 31 and 32.) Upon this dry platform a portion of the operation of building the ship is performed. For this purpose the platform is constructed with a working-floor, $z$, upon which the line of the keel is marked out, together with the plan of the sides and the positions of the uprights. The first stage of the construction, which consists in the formation of a basin, is performed in the manner next hereinafter described.

*Construction of the basin or first compartment and stowage of the trees or lumber within the same.*—The transverse beams of the bottom are first placed in position and lashed to blocks $c$, sufficiently elevated to allow the external timbers of the bottom to be wedged up. The latter, which have been previously taken on board, are placed in position, commencing at the center. The first external timber is placed in position in the center in the corresponding recess and wedged up by means of hydraulic jacks, its length and tension, as well as that of the other external bottom timbers, being regulated according to the plan drawn upon the platform by driving in the wedges of the scarf-joints more or less. The adjacent filling-pieces of soft wood are brought up and immediately placed in position. The next timbers are then laid in the corresponding grooves and immediately wedged up, and, consequently, stretched by means of hydraulic jacks $v$, acting at an angle of forty-five degrees and taking a point of support on the trusses of the platform, which are provided with suitable notches for the reception of the jacks. The extremities of the external timbers are then immediately braced together. When a certain number of these timbers have been placed in position the irons which connect them to the transverse beams are put on, the bolt-holes are bored, and the irons screwed down. The operation proceeds until the blocks $c$ are reached. The timbers immediately preceding the block are not bolted on, and the hole is utilized for passing a wire rope, for the purpose of binding the cross-beams of the bottom to the trusses upon fresh blocks from above. After the blocks $c$ have been removed the tightening or wedging up of the timbers is proceeded with as far as the lateral corner or edge of the bottom. When the bottom is thus completed it simply remains to place the uprights and longitudinal wedges in position. These uprights rest upon blocks, and are maintained in a vertical position by lashing them to horizontal timbers or blocks, $c'$, which, in turn, are tied to the chains which support the corresponding trusses $F'$. (See Figs. 33, 34, and 35.) In order to complete the first compartment it is necessary to continue the side up to the first horizontal transverse beam. The building up of the external side timbers is effected in a vertical direction, the jacks employed for wedging them up taking their bearing upon the last cross-block on the uprights by the interposition of pieces of timber, as shown in Fig. 33. In laying down the last row of timbers of the first compartment the filling-piece adjacent to the transverse beam is placed under a block, $t$, Figs. 34 and 35, which fits over it and is wedged up under the post $p$ in such a manner as to prevent any disturbance arising from the swelling of the filling-piece, and at the same time leaving a clear space for the head of the horizontal transverse beam. The basin thus formed may then be placed in the water after raising each of the trusses until they touch the keels in order to diminish as much as possible the depth of water underneath the platform. This operation is performed by removing the flooring and longitudinal timbers of the platform and raising all the corresponding trusses one at a time. In order to connect the uprights firmly to the sides during this short operation clamps $a$ are employed, which embrace them both. The launch is effected by opening simultaneously the cocks communicating with the hydraulic pistons connected to the suspending-chains $c^2$. As soon as the basin is in the water the filling-pieces swell rapidly and prevent leakage, the chains retaining the trusses are detached, and the latter are removed in order to allow the vessel to become more deeply immersed as the construction advances. The trees or timbers forming the cargo are immediately brought up and stowed away in such a manner as to leave the necessary space for the diagonal timbers, which are then last to be placed in position. This first stage of the operation being thus completed, the building up of the vessel is proceeded with in the inverse order, as hereinbefore described. Thus, when the horizontal transverse beams $T'$ are placed in position and the posts $p$ removed, the placing or stowing of the cargo for the second compartment is first proceeded with, the timber being held in position by the uprights, and the sides are subsequently built up round it—that is to say, the external timbers of the sides, with the corresponding filling-pieces, are built up in the same order and by the same means as the sides of the first compartment or basin. By these means the tension of the cargo and of the sides is balanced or equalized. After building up the sides of the second compartment the large vertical wedges are placed in position, and are driven home in a vertical direction by means of a hydraulic jack taking its bearing in the same manner as those employed for the timbers of the side. The diagonal timbers are placed in position by means of the two traveling carriers P and P' on the wharf, whereby it is rendered possible to move them with facility at either extremity, Figs. 36 and 37. When in position they are wedged up laterally and at their feet. The construction of the third compartment is then completed in the same manner as described with reference to the preceding compartment. The deck-planks are laid with the aid of hand-clamps. This operation is performed by commencing at the center. The central planks, $a^x$ $a^x$, are placed in position side by side and forced together with a certain number of clamps, represented by fine lines in Fig. 38. The next planks, with a thickness of soft wood between each, are then forced up by the clamps indicated by thicker lines. The tails of these clamps being then lashed fast, the others are removed and employed to fix the next rows of planks, and so on in succession. The holes for the reception of the claws of the clamps are afterward filled up with plugs.

*Masting—Leaving the dock—Final arrangements.*—The last operations of the process of construction consist in shipping the rudder, which is effected with facility by means of overhead travelers, completing the sides, the bulwarks or netting, the poop and forecastle, depositing the masts on the deck with the greatest amount of rake possible, and in such a manner that the legs or feet bear upon the deck and the heads rest upon chocks. These materials having been placed on board, the operation of masting is proceeded with, making use for this purpose of the overhead travelers, which are provided with the requisite hoisting-tackle. All that then remains to be done is to complete the deck at the foot of the masts and to place on board the last of the materials, after which the vessel is warped onto moorings in order to complete its outfit and make the last preparations for the voyage.

It is obvious that the forms, proportions, and dimensions of the various parts can be varied. Instead of having angles formed at the junction of the timber and at other points, curved connecting-surfaces can be employed.

The machine-tools are described herein in order to illustrate the best mode of carrying the invention into effect; but the invention is not limited to them, as it may be carried out with other tools of suitable construction. The tools themselves are not claimed herein, but are reserved for separate application.

Having thus fully described my said invention and the manner in which the same is or may be carried into effect, what I claim, and desire to secure by Letters Patent, is—

1. A wall for ships and other structures composed of hard wood and dried and compressed soft wood interposed, substantially as described.

2. In a wall for ships and other structures, the combination, with round or partly round logs, of filling-pieces of wood compressed and provided with longitudinal grooves or gutters, so as to fit the round portions of said logs, substantially as described.

3. A ship's hull having walls composed of natural or rough hewn timber, with filling-pieces of soft compressed wood interposed, the whole being bound together by a frame-work of iron bands, substantially as described.

4. The ship's frame-work comprising, in combination with the uprights and cross-beams, the horizontal bands terminating in wide metal plates which embrace the stem and stern of the ship, the vertical bands bolted to plates embracing the aforesaid uprights, the cross-pieces at the ends of the cross-beams, bolted thereto and to the horizontal and vertical bands, substantially as described.

In testimony whereof I have signed my name to this specification in the presence of two subscribing witnesses.

CONSTANTIN ADRIEN HERMAN CHRETIEN DE WINTER.

Witnesses:
    JOSEPH DELAGE,
    PHILIP WALKER.